US012693006B1

(12) United States Patent
Xiong

(10) Patent No.: US 12,693,006 B1
(45) Date of Patent: Jul. 28, 2026

(54) WATERPROOF LAMP STRUCTURE

(71) Applicant: Jinyun Xiong, Funan County (CN)

(72) Inventor: Jinyun Xiong, Funan County (CN)

( * ) Notice: Subject to any disclaimer, the term of this patent is extended or adjusted under 35 U.S.C. 154(b) by 0 days.

(21) Appl. No.: 19/414,238

(22) Filed: Dec. 9, 2025

(51) Int. Cl.
*F21V 31/00* (2006.01)
*F21V 5/04* (2006.01)
*F21V 19/00* (2006.01)
*F21Y 115/10* (2016.01)

(52) U.S. Cl.
CPC ............ *F21V 31/005* (2013.01); *F21V 5/048* (2013.01); *F21V 19/003* (2013.01); *F21Y 2115/10* (2016.08)

(58) Field of Classification Search
CPC ..................................................... F21V 19/003
See application file for complete search history.

(56) References Cited

U.S. PATENT DOCUMENTS

2005/0139850 A1* 6/2005 Ikeda ...................... B29C 45/34 257/E21.504
2011/0194292 A1* 8/2011 Tsai .......................... F21S 4/10 362/231
2016/0377281 A1* 12/2016 Xu ............................ F21V 9/06 362/249.02

FOREIGN PATENT DOCUMENTS

CN 102401252 A * 4/2012 .............. F21V 31/04
KR 20140098492 A * 8/2014 ............... F21K 9/20
KR 20250095037 A * 6/2025 ........... H10H 20/854
WO WO-2009036934 A2 * 3/2009 .............. F21V 29/80
WO WO-2010079089 A2 * 7/2010 .............. F21V 15/01
WO WO-2016003048 A1 * 1/2016 ................ F21S 4/10
WO WO-2018138533 A1 * 8/2018 ............ F21V 31/005

* cited by examiner

*Primary Examiner* — Zheng Song
(74) *Attorney, Agent, or Firm* — Nicholas Makridakis

(57) ABSTRACT

A waterproof lamp structure includes an upper housing and a lower housing, where the upper housing and the lower housing are combined to form an accommodating space, a printed circuit board (PCB) is mounted in the accommodating space, a guiding passage is formed on a side surface of the accommodating space, at least one elastic strip is disposed on the guiding passage, wires are connected to the PCB and extend outward along the guiding passage, and a preset angle is formed between an arrangement direction of the elastic strip and an extension direction of the guiding passage; and when the wires pass through the guiding passage, the elastic strip is compressed and deforms to fill a space between the wires and the guiding passage, such that the accommodating space achieves a sealed condition. The present disclosure achieves effective waterproof and dust-proof effects through a specific arrangement.

10 Claims, 4 Drawing Sheets

WATERPROOF LAMP STRUCTURE

TECHNICAL FIELD

The present disclosure relates to the technical field of lamps, and in particular to a waterproof lamp structure.

BACKGROUND

With mature development of light emitting diode (LED) technology, LED lamps are gradually replacing conventional incandescent lamps and fluorescent lamps. Compared to these conventional lamps, the LED lamps not only have advantages such as long service life and excellent chromaticity, but more importantly, demonstrate significant effects in energy conservation. An LED lamp in the prior art mainly includes a housing, a lamp cover, and an internal LED emitter. A sealant is employed between the housing and the lamp cover for sealing and waterproofing, while some designs even completely omit waterproof sealing. Undoubtedly, application environments of lamps without waterproof sealing are limited.

Currently available waterproof lamps with electric wires usually lack waterproof designs at wiring points, and sealants are also prone to leakage, resulting in insufficient waterproof performance that fails to meet practical application requirements.

SUMMARY

The present disclosure provides a waterproof lamp structure, which solves the problem of insufficient waterproof performance of lamps mentioned in the above background through a specific arrangement in which elastic strips in a predetermined number at a predetermined angle are disposed at a point where connecting wires exit from two combined housings, and the two housings squeeze the connecting wires after being assembled, thereby causing the elastic strips to deform and subsequently seal gaps between the connecting wires and the housings.

The present disclosure provides the following technical solution:

A waterproof lamp structure includes an upper housing and a lower housing, where the upper housing and the lower housing are combined to form an accommodating space, a printed circuit board (PCB) is mounted in the accommodating space, a guiding passage is formed on a side surface of the accommodating space, at least one elastic strip is disposed on the guiding passage, wires are connected to the PCB and extend outward along the guiding passage, and a preset angle is formed between an arrangement direction of the elastic strip and an extension direction of the guiding passage; and when the wires pass through the guiding passage, the elastic strip is compressed and deforms to fill a space between the wires and the guiding passage, such that the accommodating space achieves a sealed condition.

As a preferred technical solution of the present disclosure, notches are formed in both sides of the accommodating space, and guiding structures are fixedly connected at the notches; and when the upper housing and the lower housing are assembled, the two guiding structures are fitted with each other to form the guiding passage.

As a preferred technical solution of the present disclosure, the elastic strip has a cross-sectional shape that enables the elastic strip to press tightly against the wires.

As a preferred technical solution of the present disclosure, the cross-sectional shape of the elastic strip is circular or polygonal.

As a preferred technical solution of the present disclosure, a height of the cross-sectional shape of the elastic strip ranges from 0.5 mm to 2 mm.

As a preferred technical solution of the present disclosure, the arrangement direction of the elastic strip is perpendicular to the extension direction of the guiding passage.

As a preferred technical solution of the present disclosure, a lens is disposed in the upper housing.

As a preferred technical solution of the present disclosure, the lens is hemispherical.

As a preferred technical solution of the present disclosure, micro-structural members are disposed on an inner wall of the upper housing.

As a preferred technical solution of the present disclosure, a positioning post is disposed in the accommodating space, the positioning post is fixedly connected to the lower housing, and a positioning hole corresponding to the positioning post is formed in the PCB.

Compared with the prior art, the waterproof lamp structure provided by the present disclosure has the following beneficial effects:

1. In the waterproof lamp structure, the hemispherical micro-structural members are disposed on the inner wall of the upper housing, and these hemispherical protrusions may scatter light, such that the light reflects or refracts in different directions, and concentrated intense light is transformed into uniform diffused light, thereby providing a more comfortable visual perception for human eyes and ensuring that the lens serves as a main light-emitting point.

Parts not involved in this device are identical to those in the prior art or may be implemented using the prior art. The present disclosure achieves effective waterproof and dust-proof effects through a specific arrangement in which elastic strips in a predetermined number at a predetermined angle are disposed at a point where connecting wires exit from two combined housings, and the two housings squeeze the connecting wires after being assembled, thereby causing the elastic strips to deform and subsequently seal gaps between the connecting wires and the housings.

BRIEF DESCRIPTION OF THE DRAWINGS

In order to explain the technical solutions in embodiments of the present disclosure or in the prior art more clearly, the drawings to be used in the description of the embodiments or the prior art will be briefly introduced below. In all the drawings, elements or parts are not necessarily drawn to actual scale.

Figure 1:
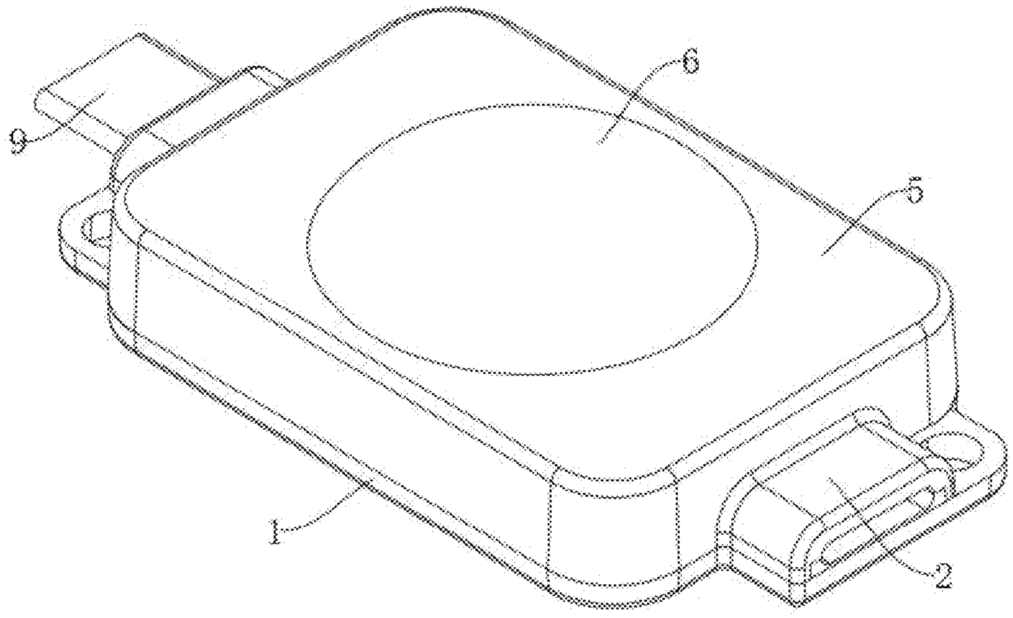
FIG. 1 is a schematic perspective view of the present disclosure.
Figure 2:
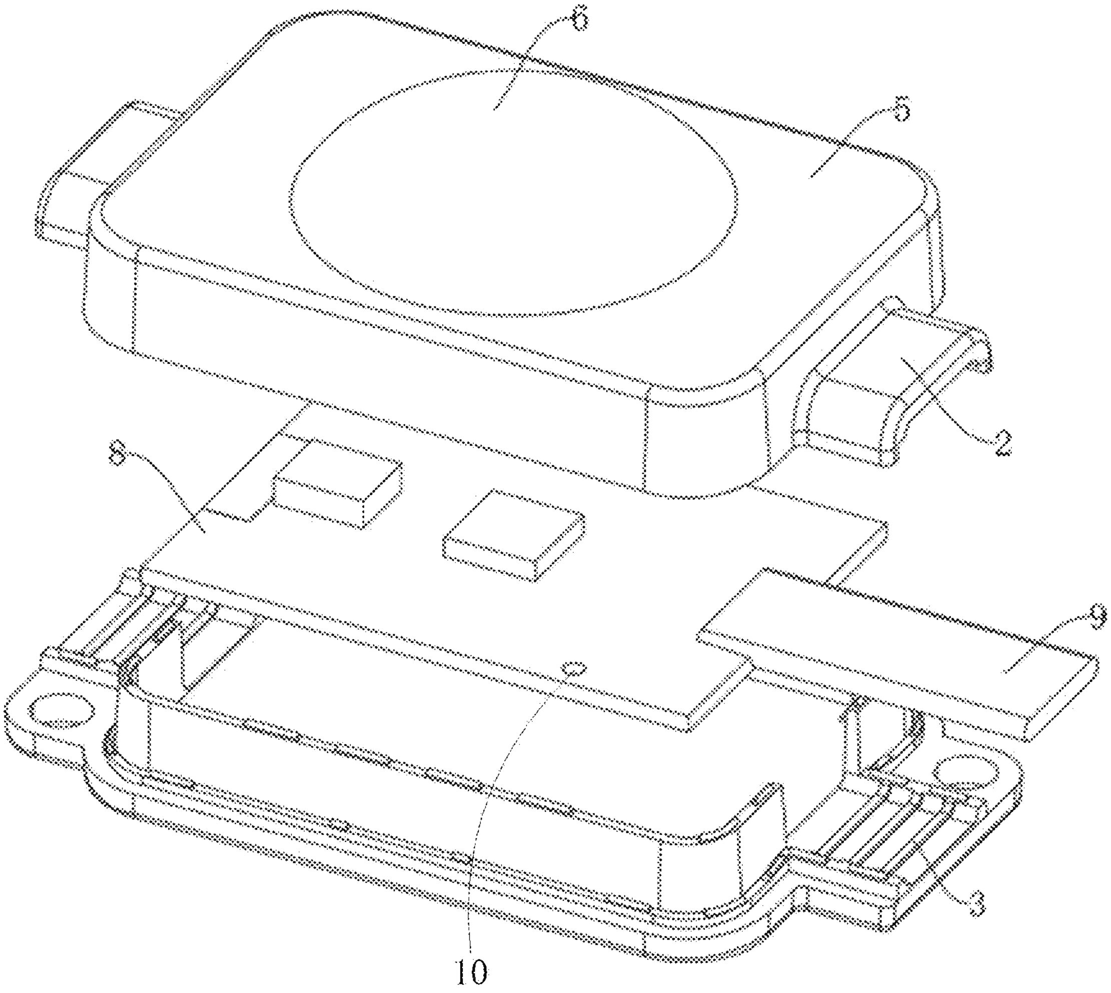
FIG. 2 is a schematic exploded view of the present disclosure.
Figure 3:
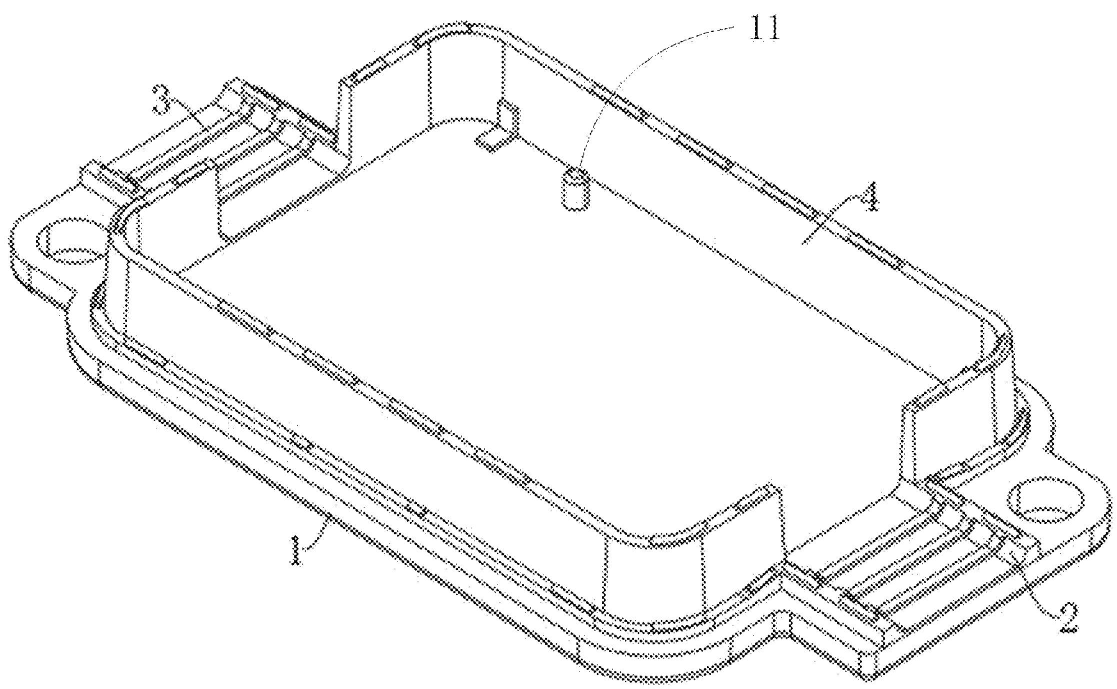
FIG. 3 is a schematic perspective view of a lower housing of the present disclosure.

Reference numerals in the figures: 1-lower housing; 2-guiding passage; 3-elastic strip; 4-accommodating space; 5-upper housing; 6-lens; 7-micro-structural member; and 8-PCB; 9-connecting wire; 10-positioning hole; and 11-positioning post.

DETAILED DESCRIPTION

The technical solutions in embodiments of the present disclosure will be clearly and completely described below in combination with the drawings in the embodiments of the present disclosure. It is obvious that the described embodiments are only a part of, rather than all of, the embodiments of the present disclosure. On the basis of the embodiments in the present disclosure, all other embodiments obtained by those of ordinary skill in the art without making creative efforts will fall within the protection scope of the present disclosure.

Embodiment

With reference to FIGS. 1 to 4, a waterproof lamp structure includes an upper housing 5 and a lower housing 1 which are mainly made of a plastic material. Through holes are formed in ends of the lower housing 1 to facilitate fixation of the lower housing 1 using screws or the like. The upper housing 5 and the lower housing 1 are combined by means such as adhesive bonding, fusion welding, or snap-fitting and sealant sealing, and after assembly, an accommodating space 4 is formed. Electronic components, such as a PCB 8, may be mounted in the accommodating space 4. A guiding passage 2 is formed on a side surface of the accommodating space 4. Typically one guiding passage is provided, but in this embodiment, two guiding passages are arranged opposite to each other, thereby achieving series or parallel connection of a plurality of waterproof lamps. One to six elastic strips 3 are fixedly connected to each guiding passage 2. Connecting wires 2 from the PCB 8 exit the accommodating space 4 and extend outward along the guiding passages 2. A preset angle is formed between an arrangement direction of the elongated elastic strips 3 and an extension direction of the guiding passages 2, which may be selected within a range of 30° to 120°. In this embodiment, the angle is set to be perpendicular. When the connecting wires 9 pass through the guiding passages 2, the elastic strips 3 are compressed and deform to fill spaces between the connecting wires 9 and the guiding passages 2, such that the accommodating space 4 achieves a sealed condition. Consequently, effective waterproof, dustproof, and similar effects are achieved for the lamp structure. In some embodiments, when a plurality of elastic strips 3 are disposed, gaps are present therebetween, and a distance between these gaps is typically 2 to 3 times a height or thickness of each elastic strip 3.

In the above design, effective waterproof and dustproof effects are achieved through a specific arrangement in which elastic strips 3 in a predetermined number at a predetermined angle are disposed at a point where connecting wires 9 exit from two combined housings, and the two housings squeeze the connecting wires 9 after being assembled, thereby causing the elastic strips 3 to deform and subsequently seal gaps between the connecting wires 9 and the housings.

In some embodiments, notches are formed in both sides of the accommodating space 4, and plate-like guiding structures are fixedly connected at the notches. When the upper housing 5 and the lower housing 1 are assembled, the two guiding structures are fitted with each other to form the guiding passages 2. This method allows for arranging the elastic strips 3 in a desired number. Moreover, due to the presence of an independent space, the elastic strips 3 may be arranged at more angle options, such as 30°, 45°, 60°, 90°, and 120°. In other embodiments, the guiding structures may be omitted, and the elastic strips 3 are fixed directly to the wall thickness of the housing; and the elastic strips 3 may also achieve a sealing function when compressed.

In some embodiments, each elastic strip 3 has a cross-sectional shape that enables the elastic strip to press tightly against the connecting wires 9. The cross-sectional shape is circular or polygonal, such as rectangular, pentagonal, or triangular, and the specific shape is selected according to a process. Of course, the circular and rectangular shapes are optimal, as these shapes provide effective sealing effects while being relatively simple to manufacture and fix.

In some embodiments, no seam or connecting structure exists between the elastic strips 3 and the guiding passages 2. This seamless connection not only enhances an overall structural strength but also improves stability. When bearing stress, the integrated structure is capable of distributing stress more effectively, thereby preventing damage caused by stress concentration, and extending the service life of the waterproof lamp structure. Moreover, as the elastic strips 3 are integrally formed with the guiding structures, bonding therebetween is tighter, thereby eliminating gaps caused by poor bonding. This tight bonding helps reduce penetration of moisture or other harmful substances, and significantly improves the sealing performance of the waterproof lamp structure. This sealing performance is particularly important in a humid or harsh environment, and ensures the normal operation and service life of the waterproof lamp structure.

In some embodiments, a height of the cross-sectional shape of each elastic strip 3 ranges from 0.5 mm to 2 mm, such as 0.5 mm or 1 mm, and preferably 2 mm. A deformation effect under compression is excellent, thereby resulting in better sealing and fitting effects with the deformable connecting wires 9.

Figure 4:
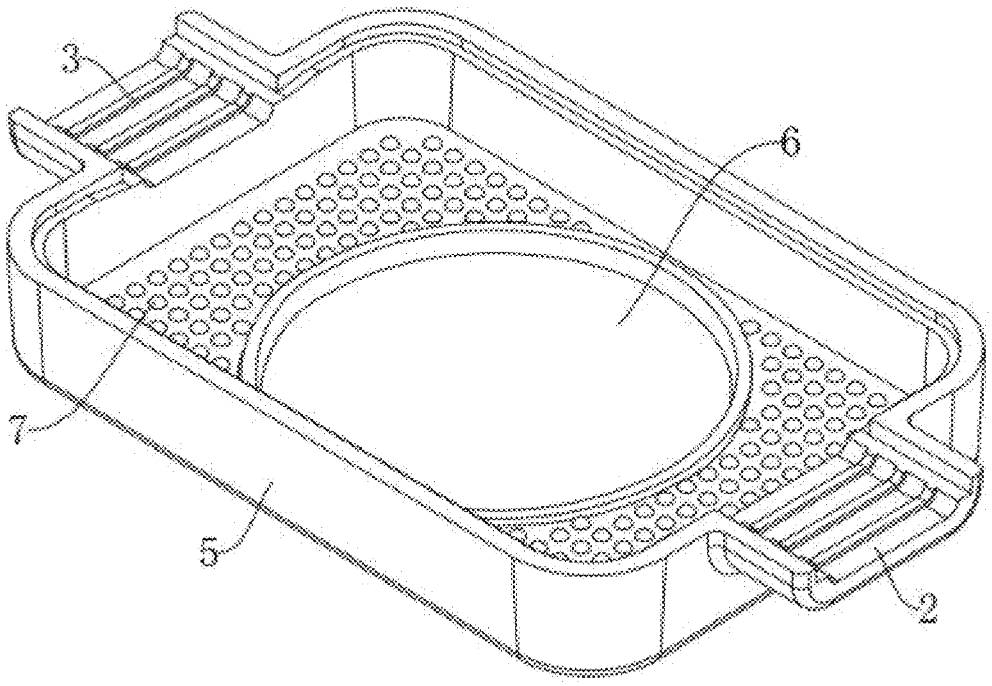
FIG. 4 is a schematic perspective view of an upper housing of the present disclosure.

In some embodiments, a lens 6 is disposed in the upper housing 5. As seen in FIG. 1, the lens 6 is of an outwardly convex hemisphere, and as seen in FIG. 4, the lens 6 is of an inwardly concave hemisphere, with the purpose of enhancing light from an LED chip on the PCB 8.

In some embodiments, the entire upper housing 5 is of a transparent structure, and micro-structural members 7 are disposed on an inner wall of the upper housing 5. The micro-structural members 7 are hemispherical, rhombic, or the like, with a diameter significantly smaller than a hemispherical diameter of the lens 6, preferably 0.5 mm or 1 mm. These hemispherical protrusions may scatter light, such that the light reflects or refracts in different directions, and concentrated intense light is transformed into uniform diffused light, thereby providing a more comfortable visual perception for human eyes and ensuring that the lens 6 serves as a main light-emitting point.

In some embodiments, a positioning post 11 is disposed in the accommodating space 4, the positioning post 11 is fixedly connected to the lower housing 1, and a positioning hole 10 corresponding to the positioning post 11 is formed in the PCB 8. The positioning hole 10 is configured to fix the PCB 8 to prevent the PCB 8 from loosening or detaching, and ensure alignment between the lens 6 and the LED chip on the PCB 8.

Components not described in detail herein belong to the prior art.

Finally, it should be stated that the above embodiments are only used for explaining, rather than limiting, the technical solutions of the present disclosure. Although the present disclosure is described in detail with reference to the above embodiments, those of ordinary skill in the art should understand that modifications may be made to the technical solutions of the present disclosure, or equivalent substitutions may be made to part of the technical features thereof; and such modifications or equivalent substitutions will not cause the essences of the corresponding technical solutions to deviate from the spirit and scope of the technical solutions of various embodiments of the present disclosure.

What is claimed is:

1. A waterproof lamp structure, comprising an upper housing and a lower housing;

wherein the upper housing and the lower housing are combined to form an accommodating space, and a printed circuit board (PCB) is mounted in the accommodating space;

wherein two guiding passages, arranged opposite each other and extending outward, are formed on both sides of the accommodating space;

wherein at least one elastic strip is disposed on each of the guiding passages, connecting wires are connected to the PCB and extend outward along the guiding passages, and a preset angle of 30° to 120° is formed between an arrangement direction of the elastic strip and an extension direction of the guiding passages; and when the connecting wires pass through the guiding passages, the elastic strip is compressed and deforms to fill a space between the connecting wires and the guiding passages, such that the accommodating space achieves a sealed condition.

2. The waterproof lamp structure according to claim 1, wherein notches are formed in the both sides of the accommodating space, and guiding structures are fixedly connected at the notches; and when the upper housing and the lower housing are assembled, the two guiding structures are fitted with each other to form the guiding passages.

3. The waterproof lamp structure according to claim 1, wherein the elastic strip has a cross-sectional shape that enables the elastic strip to press tightly against the connecting wires.

4. The waterproof lamp structure according to claim 3, wherein the cross-sectional shape of the elastic strip is circular or polygonal.

5. The waterproof lamp structure according to claim 3, wherein a height of the cross-sectional shape of the elastic strip ranges from 0.5 mm to 2 mm.

6. The waterproof lamp structure according to claim 1, wherein the arrangement direction of the elastic strip is perpendicular to the extension direction of the guiding passages.

7. The waterproof lamp structure according to claim 1, wherein a lens is disposed in the upper housing.

8. The waterproof lamp structure according to claim 7, wherein the lens is hemispherical.

9. The waterproof lamp structure according to claim 1, wherein micro-structural members are disposed on an inner wall of the upper housing.

10. The waterproof lamp structure according to claim 1, wherein a positioning post is disposed in the accommodating space, the positioning post is fixedly connected to the lower housing, and a positioning hole corresponding to the positioning post is formed in the PCB.

* * * * *